United States Patent [19]

Kreis et al.

[11] Patent Number: 5,411,308

[45] Date of Patent: May 2, 1995

[54] GIRDER ASSEMBLY FOR A LIGHT ALLOY MOTOR VEHICLE BODY

[75] Inventors: Gundolf Kreis, Oberstimm; Heinrich Timm; Alois Feldschmid, both of Ingolstadt, all of Germany

[73] Assignee: Audi A.G., Ingolstadt, Germany

[21] Appl. No.: 165,973

[22] Filed: Dec. 10, 1993

[30] Foreign Application Priority Data

Jun. 14, 1991 [DE] Germany .......... 41 19 598.1

[51] Int. Cl.6 ............................................. B62D 27/02
[52] U.S. Cl. ............................ 296/30; 296/188; 296/205; 403/13; 403/206; 403/361
[58] Field of Search .......... 296/188, 189, 193, 194, 296/195, 203, 204, 205, 209, 29, 30, 187; 403/11, 13, 206, 207, 271, 272, 361

[56] References Cited

U.S. PATENT DOCUMENTS 2,344,092  3/1944  Komenda ..................... 296/192

FOREIGN PATENT DOCUMENTS

| 0055398 | 7/1982 | European Pat. Off. . |
| 0146716 | 7/1985 | European Pat. Off. . |
| 0399648 | 11/1990 | European Pat. Off. . |
| 0454942 | 11/1991 | European Pat. Off. . |
| 2254299 | 6/1973 | Germany . |
| 2335553 | 1/1974 | Germany ................ 296/188 |
| 3707554 | 9/1987 | Germany . |
| 3839885 | 5/1990 | Germany . |
| 182177 | 7/1989 | Japan ..................... 296/194 |
| 1194499 | 6/1970 | United Kingdom . |
| 1209714 | 10/1970 | United Kingdom . |
| WO90/02680 | 3/1990 | WIPO . |

*Primary Examiner*—David M. Mitchell
*Assistant Examiner*—Andrew C. Pike
*Attorney, Agent, or Firm*—Jacques M. Dulin

[57] ABSTRACT

In a light-metal vehicle body, a girder assembly joins a first longitudinal girder member located in a forecarriage region of the vehicle body to a second, laterally offset, and generally longitudinally oriented side sill member. The girder assembly includes a pair of open shell-shaped, light-metal castings which form a single, hollow section enclosure when brought together along their mutual open face regions. The concave interior surfaces of the shell-shaped casting are provided with a plurality of spaced integrally formed stiffening rib members. The stiffening ribs are oriented transverse to the curving longitudinal center axis of the girder assembly which curves in conformance with the Z-shape configuration. The stiffening ribs of each shell-shaped castings are arranged in coordinate pairs such that they formed a series of substantially continuous webs along an interior cross section of said girder assembly. The invention functions to resist plastic deformation of the girder assembly and collapse of said hollow section enclosure in the event of an impact to the vehicle.

12 Claims, 1 Drawing Sheet

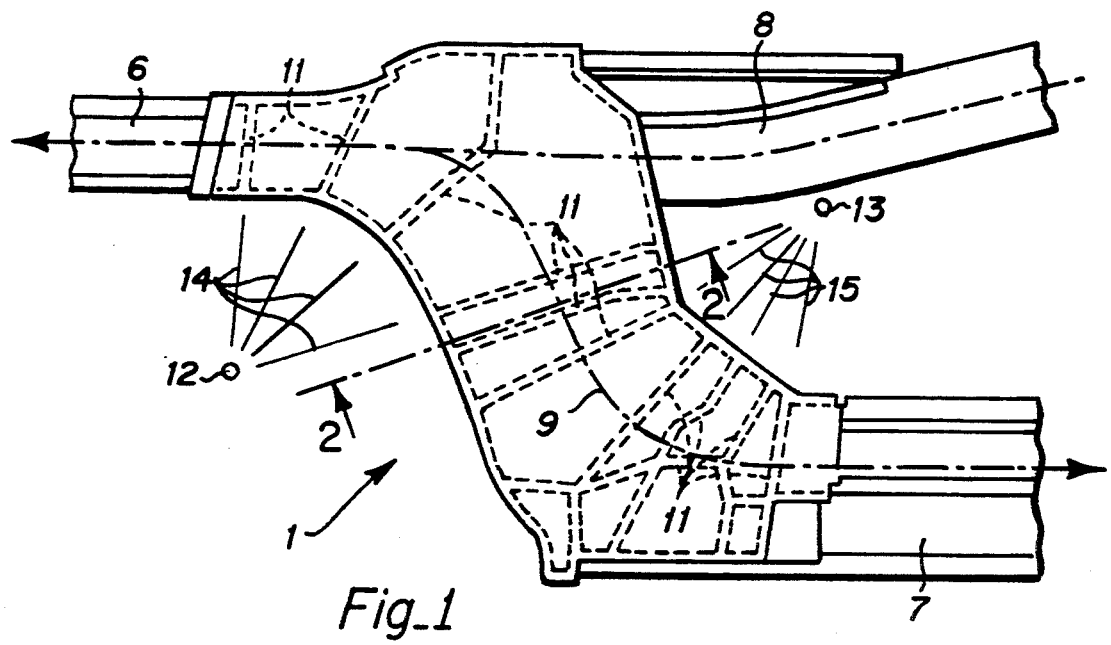
Fig_1
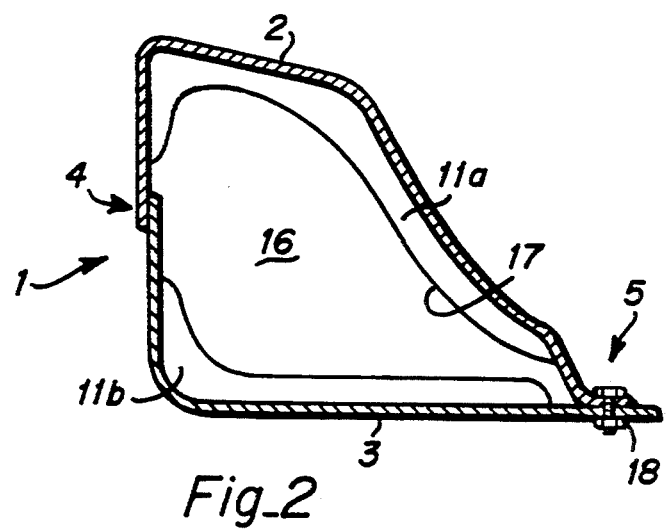
Fig_2

GIRDER ASSEMBLY FOR A LIGHT ALLOY MOTOR VEHICLE BODY

This is a continuation application of international application number PCT/EP92/00958, having an international filing date of May 2, 1992, now abandoned, priority of which is claimed under 35 U.S.C. §120.

BACKGROUND OF THE INVENTION

1. Field of the Invention

The invention relates generally to improvements in motor vehicle chassis construction. More particularly, the invention relates to a girder assembly for joining two, laterally offset, longitudinal girder members of a light-metal vehicle body.

2. Description of the Prior Art

From German Patent Document DE-OS 37 07 554 there is disclosed a hollow section vehicle frame rail assembly comprising a first, upper U-shaped channel member, a second, lower U-shaped channel member, and an intermediate corrugated sheet in the form of a ribbed plate which is secured between the upper and lower channel members. The ridges and furrows of the corrugated plate preferably include flat regions which are joined together by webbed panel portions that span the distance between opposing walls of the rail assembly. The webbed panel portions act as stiffeners and are oriented at an acute angle with respect to the transverse axis perpendicular to the longitudinal axis of the rail assembly.

This document teaches to maximize the resistance to bending moments along the longitudinal axis of the rail by designing the webbed panel portions with a trapezoidal shape. The stiffness of the rail assembly is thus affected by the acute angled webs which span the distance and take up substantially the entire free space region between the upper and lower U-shaped channel members.

The arrangement as described permits a rail assembly of this kind to be designed with a more favorable overall weight for the case of normal, elastic loading. However, in the case where a vehicle undergoes a heavy impact, a completely different set of stresses occur in the form of plastic deformations, whereby the cross section of the rail assembly of this kind is materially affected. If the cross section collapses because of a plastic deformation of the rail assembly, its stiffness is greatly reduced. The stiffening webs, being set at an acute angle with respect to the transverse axis, provide inadequate stiffness to prevent a sudden collapse of the cross section when plastic deformation occurs. Further, such trapezoidal-shaped webbed panel portions of the ribbed plate are expensive to produce for the case of a sheet metal assembly and further are difficult and/or costly to form as a light-metal castings for use in a light-metal vehicle bodywork. In the case of a light-metal vehicle bodywork in particular, the webbed panels or stiffening walls of this kind would require the additional work steps of insertion within and subsequent fastening to the interior walls of the hollow cross section which necessarily requires further expense.

German Patent Document No. DE 38 39 885 and corresponding European Patent Document No. EP 370 342 A disclose another known vehicle frame girder assembly in the form of a sheet metal longitudinal girder member which is open along one side. The interior hollow portion of this longitudinal member is fitted with an injection molded plastic insert consisting of a row of V-shaped portions. The individual V-shaped plastic portions of the insert function as stiffeners for increasing the flexural and torsional stiffness of the open girder member as compared with an open shell-shaped longitudinal girder member without such an inserted stiffener element. However, in view of the V-shaped arrangement, the stiffeners are of little assistance for maintaining the open cross section of the girder assembly in the event of an impact wherein the girder assembly is likely to experience plastic deformation.

European Patent Document No. EP 0 055 398 A1 discloses another known girder assembly in the form of a sheet metal structure, wherein two sheet metal parts, each having angled ends, are joined together in overlapping arrangement such that they form a closed hollow section. In accordance with the known prior art technique, triangular reinforcement sheets, each provided with welding flanges, are spot welded at spaced intervals along one surface of one of the two sheet metal parts prior to assembly and are further positioned to form inside corner braces for the closed hollow section. This patent document recognizes the tendency of these reinforcement triangles to tear out quickly under transverse load conditions since they are only secured along one side to the bottom wall of the hollow section. Accordingly, this patent document proposes an improved triangular brace arrangement wherein two triangular portions are linked together by a transverse brace member. The brace arrangement has a first surface fixedly attached to the first sheet metal part and a second, abutting surface for supporting by abutment the second sheet metal part so as to prevent the angle of the corner from decreasing below a predetermined value.

From German Patent Document No. DE-AS 22 54 299 a similar stiffener arrangement is known for increasing the bending strength of a closed hollow section of a longitudinal vehicle frame member formed from two sheet metal components. The stiffener arrangement includes bowl-shaped projections which are secured, open-side down, in opposition to the direction of bending such that the bowl-shaped projections abut each other. However, such stiffener arrangements having hollow sections and undercuts are difficult to manufacture as light-metal castings and accordingly are not practical for use in extruded light-metal, hollow section frame members.

All of the above described girder assemblies are designed for use in self-supporting vehicle bodies constructed from sheet metal components. Accordingly, use is made of steel sheet shaped by a conventional deep-drawing process. Hollow section girder assemblies are made from at least two deep-drawn steel sheets which are welded together. The steel sheets used to construct such self-supporting vehicle bodyworks are typically shaped in a deep drawing process. While the dies and pressing tools used for shaping the steel sheets are relatively expensive, they provide a cost-favorable solution for mass production since they permit large production runs. However, in view of the high investment costs for tooling, the aforesaid process is very cost-intensive for smaller production runs.

A more cost-favorable solution for small production runs is known, for example, from European Patent Document EP 0 146 716. This document discloses a vehicle body for a passenger car comprising a bearing structure assembled from a plurality of hollow section frame members or girders which are joined together by nodes or junction elements. The hollow section frame members are formed as extruded light-metal sections and the junction elements are formed as light-metal castings. The light-metal castings may consist of built-up shell portions which, when brought together, form an enclosure for receiving adjoining ends of two or more converging frame members. In addition to being a more cost-favorable solution for small production runs, a light-metal bodywork of the type disclosed in EP 0 146 716 weighs less and is more resistant to corrosion than a sheet metal bodywork.

In the case of such a light-metal bodywork, the longitudinal bearer or girder assembly of the vehicle forecarriage is assembled from bearer members or girders of different profiles. The bearer members are joined by inserting an end of a first bearer member within a receiving end of a second bearer member or by placing them against one another in positive engagement after which they are then fixed in place by welding. A longitudinal bearer member joint is subject to very high loads, particularly during frontal impact. Accordingly, this joint is preferably designed with sufficiently large dimensions to ensure adequate rigidity and strength.

A particularly heavily loaded node element in the bottom portion of a light-metal body of a passenger motor car is the connecting element between the longitudinal bearer or girder member located in the vehicle forecarriage portion and a bottom side sill member. The side sill member is offset laterally outwards with respect to the longitudinal girder because of the front wheel housing. This node element must be Z-shaped in order to bridge the offset. The result of such a Z-shaped configuration is discontinuous or non-linear force flow between the longitudinal girder in the forecarriage and the laterally offset sill member. This is particularly problematic in the event of a frontal impact, since the two force flows diverted in the curves of the Z-shaped path increase the risk of plastic bending in the joint. Under heavy loads, the girder cross section of the Z-shaped node element has a tendency to collapse rapidly thereby greatly reducing the stiffness and supporting function of the vehicle framework.

For the case of light-metal fabrication in general, it is known to provide reinforcement ribs on castings. The ribs are typically situated to lie substantially in the direction of the force flow such that the casting component is stiffened and the stress peaks are reduced thereby.

Until recently, light-metal vehicle bodies have not been manufactured on a large-scale basis. However, in view of recent interest in developing lighter and stronger vehicle bodies, there is a definite need in the art for light-metal node elements of Z-shaped configuration as described above which exhibit improved resistance to plastic deformation and which may be manufactured in a low cost manner.

SUMMARY OF THE INVENTION:

It is therefore a principle object of the invention to provide a cast light-metal girder assembly of Z-shape configuration for use in joining the ends of two longitudinally oriented and laterally offset bearer or girder members of a motor vehicle bodywork and wherein the girder assembly exhibits improved strength and stiffness characteristics and further exhibits improved resistance to plastic deformation and collapse of the girder assembly cross section which may otherwise occur during heavy load conditions.

It is another object of the invention to provide a girder assembly of the type described which includes integrally formed stiffening ribs oriented transverse to the flow of frontal impact force throughout the Z-shape configuration of the girder assembly.

It is another object of the invention to provide a girder assembly of the type described which is inexpensive to manufacture.

The invention comprises a girder assembly for joining two laterally offset longitudinal bearer or girder members of a light-metal vehicle bodywork. In the preferred embodiment of the invention, the girder assembly is used to join the rear end of a lower longitudinal bearer or girder member of the vehicle forecarriage to the forward end of a bottom side sill member. For purposes of the following description, the terms "bearer member" and "girder member" are used interchangeably. The longitudinal bearer member is laterally offset a distance inward (i.e., towards the vehicle's longitudinal center axis) with respect to the side sill member. The girder assembly includes two half shell portions formed as light-metal castings which, when joined together, form a hollow section node or junction element.

According to the invention herein described, in order to stiffen the hollow section structure of the girder assembly, stiffeners formed as reinforcement ribs are disposed spaced apart on the inside walls of the two open shell-shaped light-metal castings. The reinforcement ribs are shaped as narrow plate-like webs which extend substantially over the entire inside perimeter of the cross sectional shape of the hollow section structure. The individual webs are arranged transverse to the longitudinal direction of the girder assembly and have a rib height which projects a distance into the cavity or hollow interior of the girder assembly.

In customary girder designs, the wall thickness dimension and cross sectional configuration of the girder are optimized to achieve desired bending and torsional behavior. The proposed reinforcement ribs of the invention generally do not specifically enhance the flexural and torsional stiffness of the girder assembly under normal, elastic load conditions. In the case of very heavy dynamic stresses, such as typically occur, for example, during a collision of the motor vehicle, plastic deformations will likely occur. The reinforcement ribs according to the invention prevent the girder assembly cross section from collapsing during an impact situation such that the sudden loss in stiffness and reduction in the bending strength of the girder assembly resulting from the occurrence of plastic deformation is avoided.

This cross section stiffening function is achieved through the radial orientation of the reinforcement ribs with respect to the respective cross sectional plane of the girder assembly. In other words, the ribs are arranged transversely to the longitudinal axis of the girder assembly over the length of its curving Z-shaped path.

If, however, in the event of a severe vehicle crash, should the impact forces exceed a level where the stiffening ribs are no longer capable of preventing deformation of the girder assembly cross section, the reinforcement ribs still provide the additional advantageous function of impact energy absorption.

The two open shell-shaped light-metal castings of the girder assembly include mating flange surfaces which permit the light-metal castings to be bonding together, preferably by welding or alternatively by using a suitable glue adhesive. For the case of bonding by use of glue adhesives, it is understood that the mating flange surface must be made sufficiently large to ensure a strong bond. In an alternate embodiment, the light-metal castings are secured together by conventional bolt and/or screw fasteners along their mating flange surfaces. The stiffening ribs are preferably tapered in height and terminate in the regions adjacent the two flanged surfaces of each light-metal casting.

Among the advantages of the present invention are that in view of the advantages of the casting process, the reinforcement ribs can be integrally formed within the interior walls of their respective cast light-metal half-shell portions, thus eliminating the extra work steps required for installing an additional stiffening element as is the case in many of the prior art sheet metal girder assembly designs.

Another advantage of the present invention is that the cast light-metal girder assembly with the proposed arrangement of stiffening ribs can be easily produced in a Z-shape configuration in order to provide a strong and plastic deformation-resistant node element between the longitudinal girder or bearer members of a vehicle forecarriage to their corresponding laterally offset side sill members.

These and other objects and advantages of the present invention will no doubt become apparent to those skilled in the art from the following detailed description of the preferred embodiment, contained in and illustrated by the various drawing figures.

BRIEF DESCRIPTION OF THE DRAWINGS

One exemplary embodiment of the invention will be explained more fully, with further details, features, and advantages, with the aid of a drawing, in which:

FIG. 1 is a schematic plan view of a Z-shaped girder assembly for use as a joining or node element in a passenger motor car showing the connection between a front longitudinal girder mender and a side sill member laterally offset thereto; and FIG. 2 is a cross section view through the girder assembly of FIG. 1, taken along the line and in the direction of arrows 2—2.

DETAILED DESCRIPTION OF THE PREFERRED BEST MODE OF THE INVENTION

The following detailed description illustrates the invention by way of example, not by way of limitation of the principles of the invention. This description will clearly enable one skilled in the art to make and use the invention, and describes several embodiments, adaptations, variations, alternatives, and uses of the invention, including what we presently believe is the best mode of carrying out the invention.

FIGS. 1 and 2 show a girder assembly 1 comprising two open, shell-shaped light-metal castings 2 and 3 which form an enclosed hollow section when assembled as shown in FIG. 2. For this purpose, the two light-metal castings 2 and 3 are preferably provided with longitudinal flanges 4 and 5, respectively, which overlap one another to facilitate connection at their mating contact surfaces by welding, adhesive bonding or alternatively through use of conventional mechanical fasteners.

The shell-shaped light-metal castings 2 and 3 form a node element (i.e., girder assembly 1) for joining together two or more extruded light-metal bearer members of a light-metal vehicle body. In the example illustrated herein, this node element connects a light-metal longitudinal bearer or girder member 6 of the vehicle forecarriage to a substantially longitudinally oriented side sill member 7 disposed laterally offset thereto. The longitudinal girder member 6 and the side sill member 7 are preferably formed as light-metal extrusions. In the arrangement according to FIG. 1 another extruded section bearer member 8 leads to a central tunnel of the vehicle (not shown).

The longitudinal girder member 6 extends in a manner known per se behind the front wheel housing and offset laterally inward (i.e., in a direction towards and parallel to the vehicle's longitudinal center axis) relative to the side sill member 7 which is disposed more towards the outer side surface of the vehicle body. It is therefore necessary for the node element or girder assembly 1 to have a Z-shaped configuration of the kind illustrated in order to bridge this lateral offset. In the event of a frontal collision, the path of the force is correspondingly diverted in a Z-shape path through the girder assembly 1, as shown by the dot-dash line 9.

In view of the two curvatures in the force flow within the girder assembly 1, an undesirable shearing movement will occur between the longitudinal girder member 6 and the side sill member 7 in the event of a collision. The resultant high force peaks must be absorbed by the girder assembly 1. The forces associated with a frontal impact obviously tend to buckle the girder assembly 1 at the two bend regions of the Z-shaped configuration. This tendency to buckle or plastically deform means that there is a risk that the cross section will suddenly collapse thereby causing the girder assembly to dramatically and abruptly lose its stiffness.

In order to prevent such a collapse of the cross section, spaced reinforcement ribs 11 are formed integral along the inner concave surface of shell-shaped castings 2, 3. Each of these reinforcement ribs lies in a cross sectional plane transverse to or radially oriented with respect to the longitudinal axis of the girder assembly 1. Note, that the transverse orientation for the ribs is maintained throughout the curve along the Z-shaped force flow path indicated by dot-dash line 9. In order to illustrate the radial path followed by the reinforcement ribs 11 through each of the two Z-curvatures shown in FIG. 1, the center points 12, 13 of the first and second Z-curvatures are shown. The position of the reinforcement ribs is aligned coordinate with the associated radii 14, 15.

FIG. 2 shows in greater detail the concrete structure of one example rib, which projects into the hollow interior or cavity 16 of the girder assembly 1. In the top shell-shaped light-metal casting 2 a reinforcement rib portion 11a extends from the longitudinal flange region 4 to the longitudinal flange region 5 with the regions immediately adjacent flange regions being left free. Similarly, reinforcement rib portion 11b is formed on the bottom shell-shaped light-metal casting 3 and extends between flange regions 4 and 5 in the same cross sectional plane as rib portion 11a. Thus, when the two shell-shaped castings 2 and 3 are joined together, the reinforcement rib portions 11a and 11b form a single reinforcement rib structure which extends substantially continuously around the entire cross sectional inner surface. The rib portions 11a and 11b are preferably in the form of substantially flat or plate-shaped webs having a wall thickness sufficient to buttress the anticipated maximum load exerted on the shell-shaped light-metal castings 2 and 3 during an impact. These webs project into the cavity 16 by a narrow side 17. The girder assembly 1 thus does not contain any walls which subdivide the cavity 16, but rather the cavity 16 extends continuously along the Z-shaped longitudinal axis of the girder assembly 1. It should be noted that the regions 4, 5 could be joined together by welding, adhesive bonding, or mechanical fasteners. FIG. 2 illustrates the region 4 joined by welding or adhesive bonding, and the region 5 joined by a fastener 18.

The girder configuration illustrated serves the following function: the cross section and the wall thicknesses of the girder assembly 1 are preferably optimized to provide the desired flexural and/or torsional stiffness requirements in accordance with the known prior art technique such that the reinforcement ribs 11 proposed by the invention provide little or insignificant gain in the flexural or torsional stiffness characteristics of the girder assembly for normal operating stress conditions in the elastic region. However, stress conditions in a crash, and in particular a frontal or a lateral collision, are different since, in such cases, plastic deformations occur. Accordingly, the above described arrangement of the reinforcement ribs along cross sectional planes oriented approximately radially to the Z-shaped path of force flow through the girder assembly functions to prevent the collapse of the girder cross section. The invention thus helps to avoid any abrupt decreases in stiffness of this joint region. If nevertheless, under very heavy loads, the girder cross section is deformed, the reinforcement ribs still function to advantageously absorb the impact energy.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification if need be.

We claim:

1. In a light-metal vehicle body, a girder assembly for joining a first longitudinal girder member to a second longitudinal girder member disposed rearwardly of the first girder member, said girder assembly comprising in operative combination:
   a) a pair of shell-shaped light-metal castings each having a concave open face region, said shell-shaped castings forming a hollow section enclosure when brought together along their mutual open face regions, wherein said hollow section enclosure includes:
      i) a first opening sized for receivingly engaging a rearward end of the first longitudinal girder; and
      ii) a second opening sized for receivingly engaging a forward end of the second longitudinal girder;
   b) means for securing the respective open face regions of said pair of shell-shaped castings to one another; and
   c) a plurality of spaced and coordinately aligned stiffening rib members integrally formed along said concave open face regions of each of said shell-shaped castings, wherein said rib members are oriented transverse to a longitudinal center axis of said girder assembly;
   d) said stiffening rib members of each of said shell-shaped castings being arranged in coordinate pairs such that they form a series of substantially continuous webs along an interior cross section of said girder assembly, said webs providing resistance to plastic deformation of the girder assembly and preventing collapse of said hollow section enclosure in the event of an impact to the vehicle.

2. A girder assembly as in claim 1 wherein said means for securing the respective open faces of said shell-shaped castings includes:
   a) matingly engagable flange regions provided on each of said shell-shaped castings; and
   b) a weld seam joining said matingly engagable flange regions.

3. A girder assembly as in claim 2 wherein:
   a) said first longitudinal girder member is disposed in a forecarriage region of the vehicle body;
   b) said second longitudinal member is a side sill member disposed offset a lateral distance with respect to said first longitudinal girder member; and
   c) said girder assembly is generally Z-shaped in configuration as seen in top plan view in conformance with said lateral offset between said first longitudinal girder member and said side sill member.

4. A girder assembly as in claim 1 wherein said means for securing the respective open faces of said shell-shaped castings includes:
   a) matingly engagable flange regions provided on each of said shell-shaped castings; and
   b) an adhesive bond joining said matingly engagable flange regions.

5. A girder assembly as in claim 4 wherein:
   a) said first longitudinal girder member is disposed in a forecarriage region of the vehicle body;
   b) said second longitudinal member is a side sill member disposed offset a lateral distance with respect to said first longitudinal girder member; and
   c) said girder assembly is generally Z-shaped in configuration as seen in top plan view in conformance with said lateral offset between said first longitudinal girder member and said side sill member.

6. A girder assembly as in claim 1 wherein said means for securing the respective open faces of said shell-shaped castings includes:
   a) matingly engagable flange regions provided on each of said shell-shaped castings; and
   b) threaded fasteners for joining said matingly engagable flange regions.

7. A girder assembly as in claim 6 wherein:
   a) said first longitudinal girder member is disposed in a forecarriage region of the vehicle body;
   b) said second longitudinal member is a side sill member disposed offset a lateral distance with respect to said first longitudinal girder member; and
   c) said girder assembly is generally Z-shaped in configuration as seen in top plan view in conformance with said lateral offset between said first longitudinal girder member and said side sill member.

8. A girder assembly as in claim 1 wherein:
   a) said first longitudinal girder member is disposed in a forecariage region of the vehicle body;
   b) said second longitudinal member is a side sill member disposed offset a lateral distance with respect to said first longitudinal girder member; and
   c) said girder assembly is generally Z-shaped in configuration as seen in top plan view in conformance with said lateral offset between said first longitudinal girder member and said side sill member.

9. In a light-metal vehicle body, a girder assembly for joining a first longitudinal girder member located in a forecarriage region of the vehicle body to a second, laterally offset, and generally longitudinally oriented side sill member, said girder assembly comprising in operative combination:
  a) a pair of open shell-shaped, light-metal castings each having a concave open face region, said shell-shaped castings forming a single hollow section enclosure when brought together along their mutual open face regions, said hollow section enclosure including a first opening sized for receivingly engaging a rearwardly disposed end of the first longitudinal girder member and a second opening sized for receivingly engaging a forwardly disposed end of the laterally offset side sill member;
  b) means for securing the respective open faces of said pair of shell-shaped castings to one another; and
  c) a plurality of spaced and coordinately aligned stiffening rib members integrally formed along said concave open face regions of each of said shell-shaped castings and oriented transverse to a longitudinal center axis of said girder assembly;
  d) said stiffening rib members of each of said shell-shaped castings being arranged in coordinate pairs such that they form a series of substantially continuous webs along an interior cross section of said girder assembly, said webs providing resistance to plastic deformation of the girder assembly and preventing collapse of said hollow section enclosure in the event of an impact to the vehicle.

10. A girder assembly as in claim 9 wherein said means for securing the respective open faces of said shell-shaped castings includes:
  a) matingly engagable flange regions provided on each of said shell-shaped castings; and
  b) a weld seam joining said matingly engagable flange regions.

11. A girder assembly as in claim 9 wherein said means for securing the respective open faces of said shell-shaped castings includes:
  a) matingly engagable flange regions provided on each of said shell-shaped castings; and
  b) an adhesive bond joining said matingly engagable flange regions.

12. A girder assembly as in claim 9 wherein said means for securing the respective open faces of said shell-shaped castings includes:
  a) matingly engagable flange regions provided on each of said shell-shaped castings; and
  b) threaded fasteners for joining said matingly engagable flange regions.

* * * * *